United States Patent [19]

Porter

[11] 4,119,326

[45] Oct. 10, 1978

[54] VARIABLE SPEED BICYCLE

[76] Inventor: John F. Porter, 5019 Newport Ave., Bethesda, Md. 20016

[21] Appl. No.: 805,357

[22] Filed: Jun. 10, 1977

[51] Int. Cl.² .............................................. B62M 9/08
[52] U.S. Cl. ................................... 280/236; 280/261; 74/217 B; 74/230.17 A
[58] Field of Search ....................... 280/261, 236, 238; 74/230.17 A, 217 B, 230.17 F

[56] References Cited

U.S. PATENT DOCUMENTS

| 2,454,991 | 11/1948 | Cooke | 74/230.17 A |
|---|---|---|---|
| 3,837,234 | 9/1974 | Chao | 74/230.17 A |
| 3,884,316 | 5/1975 | Bowers | 74/230.17 A |
| 3,926,020 | 12/1975 | Dantowitz | 280/238 X |
| 3,965,763 | 6/1976 | Wechsler | 74/217 B |
| 4,052,912 | 10/1977 | Vukelic | 74/217 B X |

FOREIGN PATENT DOCUMENTS 984,436  2/1951  France .................. 74/217 B

*Primary Examiner*—Kenneth H. Betts
*Attorney, Agent, or Firm*—Brady, O'Boyle & Gates

[57] ABSTRACT

A variable speed bicycle including a variable speed pulley assembly connected between the bicycle pedal assembly and the bicycle rear axle, the movable pulley halves of the variable speed pulley assembly being actuated by cables, each cable having one end operatively connected to a respective movable pulley half and the opposite end connected to a winding drum mounted on the bicycle frame.

5 Claims, 5 Drawing Figures

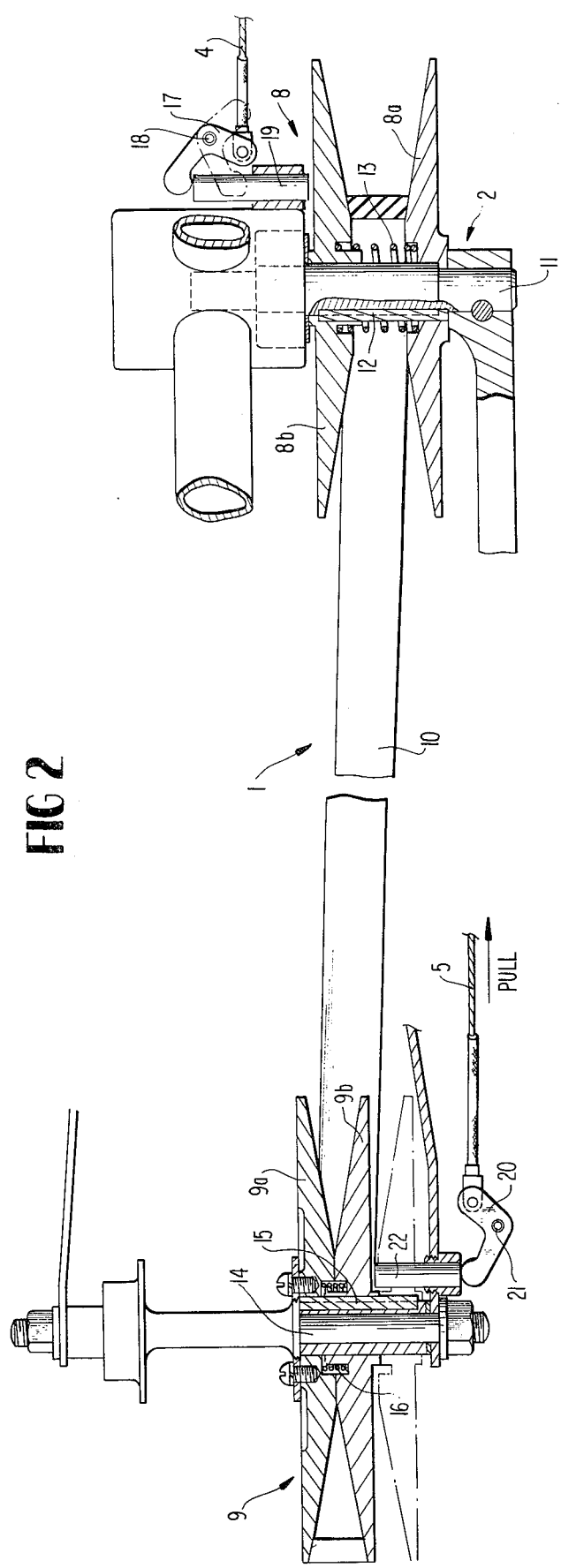
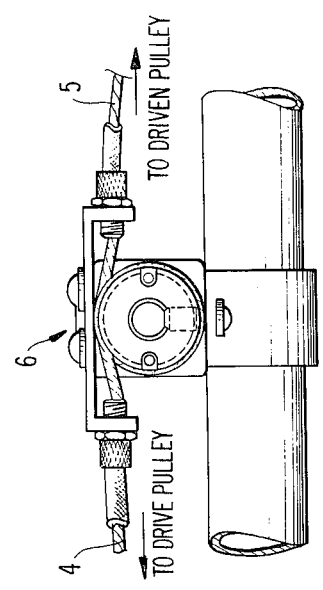
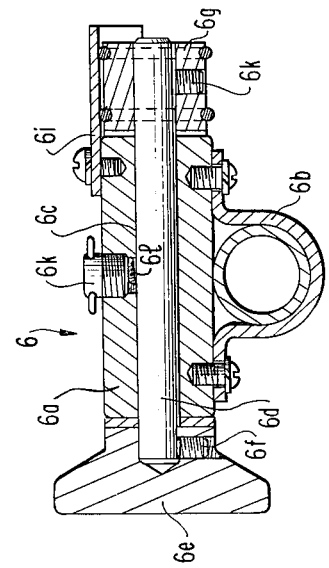
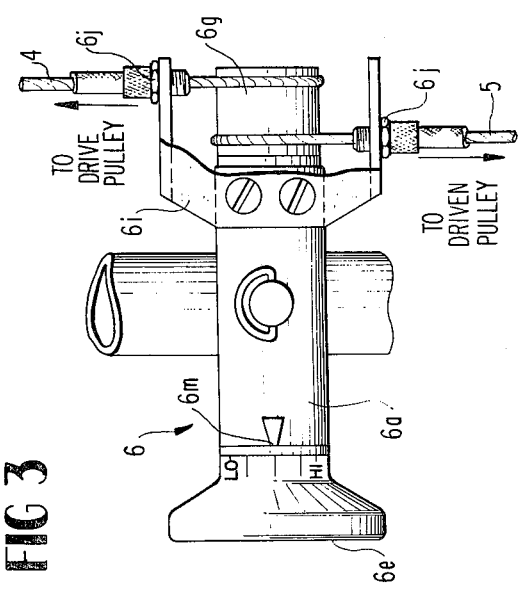

VARIABLE SPEED BICYCLE

BACKGROUND OF THE INVENTION

In conventional multiple-speed bicycles, gear shift derailleurs are employed for selectively moving the drive chain laterally of the bicycle wheel over a plurality of sprockets spaced axially along the axis of the wheel. While these types of multiple speed bicycles have been satisfactory for the most part, they have been objectionable, at times, when the drive chain either does not properly engage or slips off the selected sprocket during the shifting operation.

To overcome the problems encountered in conventional derailleur-type multiple speed bicycles, the variable speed bicycle of the present invention has been devised which comprises, essentially, a variable speed pulley assembly connected between the bicycle pedal assembly and the bicycle rear axle, the movable pulley halves of the variable speed pulley assembly being actuated by cables, each cable having one end operatively connected to a respective moable pulley half and the opposite end connected to a winding drum mounted on the bicycle frame, whereby when the winding drum is turned, the cables are actuated, causing the movable pulley halves to slide laterally relative to their respective fixed pulley halves to vary the diameters of the drive and driven pulleys, to thereby change the speed of the bicycle.

By the construction and arrangement of the variable speed pulley assembly of the present invention, not only is the problem of the disconnection of the chain from the sprocket obviated, but also, more multiple speeds can be obtained than heretofore obtained in conventional three, five or ten-speed bicycles.

BRIEF DESCRIPTION OF THE DRAWINGS

FIG. 2 is a fragmentary, top plan view, partially in section, illustrating the variable speed pulley assembly;

FIG. 3 is a fragmentary top plan view showing the winding drum for the pulley actuating cables;

FIG. 4 is a sectional, side elevational view of the drum shown in FIG. 3; and

FIG. 5 is a fragmentary, end elevational view of the drum as shown in FIG. 3.

DESCRIPTION OF THE PREFERRED EMBODIMENT

Figure 1:
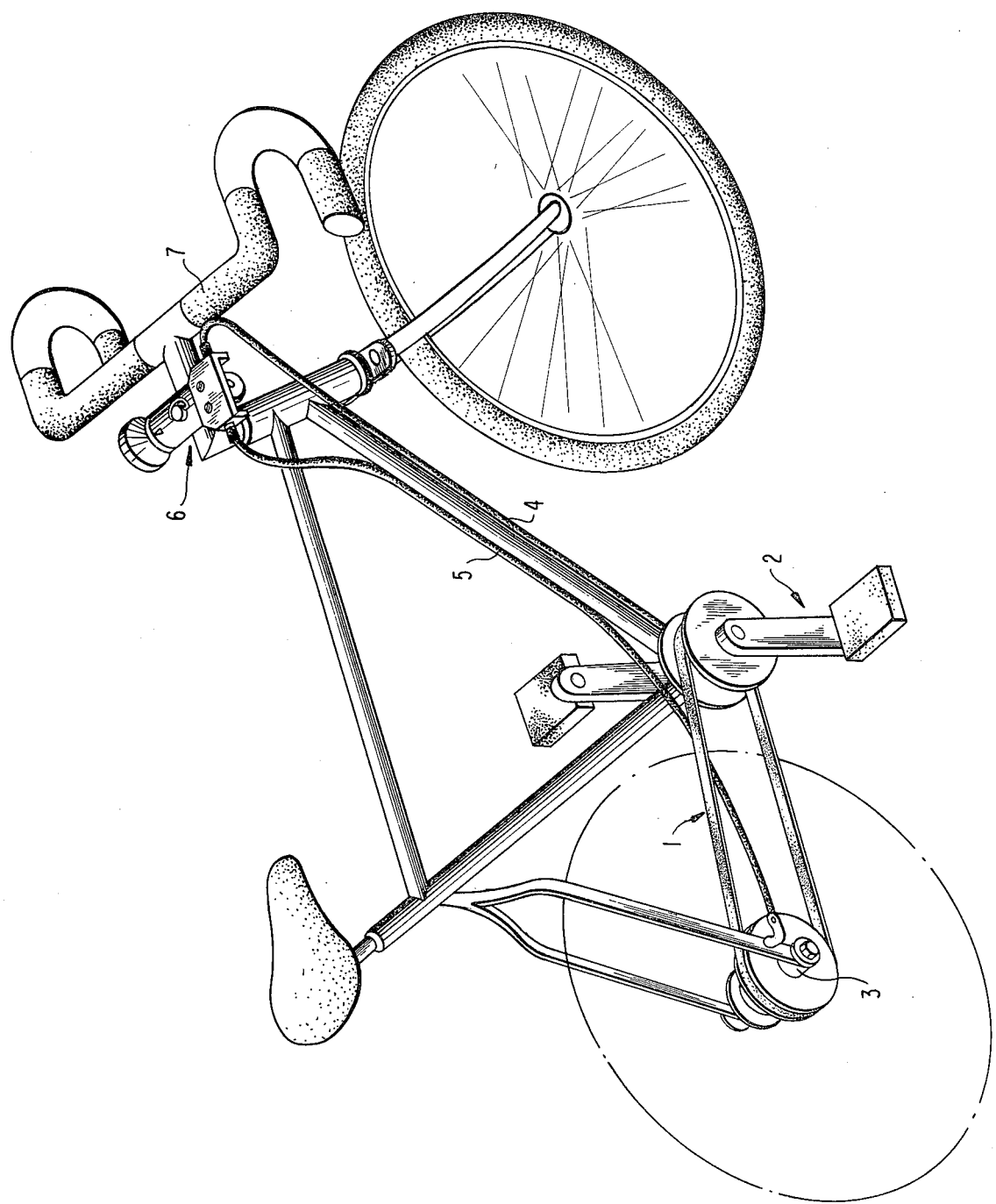
FIG. 1 is a perspective view of the variable speed bicycle of the present invention.

Referring to the drawings and more particularly to FIG. 1 thereof, the variable speed bicycle of the present invention comprises a variable speed pulley assembly 1 connected between the bicycle pedal assembly 2 and the bicycle rear axle 3. Cables 4 and 5 are connected to the movable halves of the variable speed pulleys, to be described more fully hereinafter, and to a winding drum 6 mounted on the bicycle frame in proximity to the handle bars 7.

As will be seen in FIG. 2, the variable speed pulley assembly 1 comprises a drive variable speed pulley 8 and a driven variable speed pulley 9 having a drive belt 10 extending therebetween. The drive pulley includes a fixed pulley half 8a secured to the shaft 11 of the pedal assembly 2, and a movable pulley half 8b slidably mounted on the shaft 11 through a spline connection 12. A compression spring 13 is interposed the pulley halves 8a and 8b for biasing the movable pulley half in a direction away from the fixed pulley half. The driven pulley 9 is similarly constructed, and includes a fixed pulley half 9a secured to the bicycle rear axle 14 and a movable pulley half 9b slidably mounted on the rear axle through a spline connection 15, a compression spring 16 being interposed the pulley halves for biasing the movable half 9b in a lateral direction away from the fixed pulley half 9a.

From the construction and arrangement of the variable speed pulley assembly thus far described, it will be seen that by moving the pulley halves relative to each other, the effective diameter of the respective pulley is varied, so that by moving the pulley half 8b toward the fixed pulley half 8a, the effective diameter of the drive pulley 8 is increased and if the movable pulley half 9b is simultaneously moved away from its respective fixed pulley half 9a, the effective diameter of the driven pulley 9 is decreased. By increasing the effective diameter of drive pulley 8 while simultaneously reducing the effective diameter of the driven pulley 9, the bicycle is driven at a fast speed. By decreasing the effective diameter of the drive pulley 8 and increasing the effective diameter of the driven pulley 9, the bicycle is driven at a slow speed.

In order to effect the relative movement of the pulley halves 8b and 9b, resulting in the change of the effective diameter of the respective pulley, the actuating cables 4 and 5 are provided. As will be seen in FIG. 2, one end of cable 4 is connected to one leg of a bell crank lever 17 pivotally connected as at 18 to the bicycle frame, the other leg of the bell crank lever engaging one end of a pin or plunger 19 slidably mounted in the bicycle frame, the opposite end of the plunger 19 engaging the outer face of the pulley half 8b. The cable 5 is similarly connected to a bell crank lever 20, pivotally connected to the bicycle frame as at 21. A plunger 22 is slidably mounted in the bicycle frame and has one end engaged by one leg of the bell crank lever, and the opposite end abutting the outer face of the movable pulley half 9b.

The opposite end of each of the cables 4 and 5 is connected to the winding drum assembly 6 as shown in detail in FIGS. 3, 4 and 5. The winding drum assembly comprises a cylindrical housing 6a mounted on the bicycle frame by means of a bracket 6b, the housing having a longitudinally extending bore 6c through which a shaft 6d is rotatably mounted. One end of the shaft 6d has a manually actuated knob 6e secured thereto by means of a set screw 6f, and the opposite end of the shaft 6d has a drum 6g secured thereto by means of set screw 6h, the drum having the ends of the cables 4 and 5 wound thereon in opposite directions. The housing 6a has a bracket 6i connected to the end thereof for supporting adjusting nuts 6j through which the cables 4 and 5 extend, whereby the tension of the cables can be adjusted. The housing also has a locking screw 6k threaded through the wall thereof and adapted to force a disc 6l of friction material against the shaft 6d to thereby hold the shaft in an adjusted position. Indicia 6m are provided on the opposite end of the housing and the knob to indicate the speed at which the drive assembly is set.

In the operation of the winding drum assembly and associated variable speed pulley assembly, assuming that the bicycle is to be driven at a high speed, the operator turns the knob 6e in a direction to wind the cable 4 onto the drum 6g thereby imparting a tension to cable 4 causing the bell crank lever 17 (FIG. 2) to pivot counter-clockwise against plunger 19 to move pulley half 8b toward pulley half 8a, thereby increasing the effective diameter of the drive pulley 8. Since the cables 4 and 5 are wound in opposite directions onto the drum 6g, while cable 4 is being wound onto the drum, cable 5 is being unwound therefrom resulting in a slackening of the tension in cable 5, whereby the compression spring 16 moves the pulley halves 9a and 9b away from each other to thereby decrease the effective diameter of the driven variable speed pulley 9. After the proper setting of the winding drum 6g has been made, the locking nut 6k is tightened against the disc 6l to provide a snubbing tension sufficient to resist rotation of the shaft 6d and associated drum 6g until overridden by manually turning the knob 6e.

To set the bicycle for a slower speed, the knob 6e is merely turned in a direction to wind cable 5 onto the drum 6g while simultaneously unwinding cable 4 therefrom. This results in decreasing the effective diameter of the drive pulley 8 while increasing the effective diameter of the drum pulley 9.

From the above description it will be appreciated by those skilled in the art that the variable speed pulley assembly of the present invention overcomes the disadvantages of conventional derailleur-type gear shift assemblies in that there is no disconnection of the drive belt 10 during the shifting of speeds, and by employing variable speed pulleys an infinite number of speeds can be attained.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A variable speed transmission assembly for a bicycle comprising, a drive shaft rotatably mounted on the bicycle frame, bicycle pedals connected to each end of said drive shaft, a variable speed drive pulley connected to said drive shaft, the rear axle of said bicycle providing a driven shaft, a variable speed pulley connected to said driven shaft, a drive belt extending between said drive pulley and said driven pulley, a pair of plungers slidably mounted on said bicycle frame, one end of each plunger engaging the face of a respective movable pulley half of the drive and driven variable speed pulleys, a pair of bell crank levers pivotally connected to said bicycle frame, one leg of each bell crank lever engaging the opposite end of a respective plunger, a pair of cables, and manual cable actuating means; one end of each cable being connected to the other leg of a respective bell crank lever, the opposite end of each cable being connected to said cable actuating means, whereby when the cable actuating means is moved manually in one direction the effective diameter of the drive pulley is increased while the effective diameter of the driven pulley is decreased; and when the cable actuating means is manually moved in the opposite direction the effective diameter of the drive pulley is decreased while the effective diameter of the driven pulley is simultaneously increased.

2. A variable speed transmission assembly according to claim 1, wherein the cable actuating means comprises a rotatable drum mounted on the bicycle frame in proximity to the handle bars, one of said cables being wound on said drum in one direction, the other of said cables being wound on said drum in the opposite direction.

3. A variable speed transmission assembly according to claim 2, wherein a housing is secured to the bicycle frame in proximity to the handle bars, a shaft being rotatably mounted in said housing, said drum being connected to one end of said shaft, and a manual control knob being connected to the opposite end of said shaft.

4. A variable speed transmission assembly comprising, a drive shaft mounted on a bicycle frame, bicycle pedals connected to each end of said drive shaft, a variable speed drive pulley connected to said drive shaft, the rear axle of the bicycle providing a driven shaft, a variable speed pulley connected to said driven shaft, a drive belt extending between said drive pulley and said driven pulley, a pair of cables, and cable actuating means; one end of each cable being operatively connected to a respective movable pulley half of the drive and driven variable speed pulleys, the opposite end of each cable being connected to said cable actuating means, said actuating means comprising a housing secured to the bicycle frame in proximity to the handle bars, a shaft rotatably mounted in said housing, a drum connected to one end of said shaft, one of said cables being wound on said drum in one direction, the other of said cables being wound on said drum in the opposite direction, and a manual control knob connected to the opposite end of said drum shaft, whereby when the drum is rotated in one direction the effective diameter of the drive pulley is increased while the effective diameter of the driven pulley is decreased; and when the drum is rotated in the opposite direction the effective diameter of the drive pulley is decreased while the effective diameter of the driven pulley is simultaneously increased.

5. A variable speed transmission assembly according to claim 4, wherein said one end of each cable is connected to one leg of a bell crank lever, the other leg of the bell crank lever engaging one end of a plunger, the opposite end of said plunger engaging the face of the respective movable pulley half.

* * * * *